Nov. 16, 1965 J. P. WITTMAN 3,218,575
CONSTANT AMPLITUDE PILOT SIGNAL SOURCE
Filed Dec. 19, 1962

INVENTOR.
JOHN P. WITTMAN
BY
Lippincott, Ralls & Hendricson
ATTORNEYS

United States Patent Office 3,218,575

Patented Nov. 16, 1965

3,218,575

CONSTANT AMPLITUDE PILOT SIGNAL SOURCE

John P. Wittman, Santa Clara, Calif., assignor, by mesne assignments, to Automatic Electric Laboratories, Inc., North Lake, Ill., a corporation of Delaware Filed Dec. 19, 1962, Ser. No. 245,912
3 Claims. (Cl. 331—109)

Communication systems require a large number of pilot signal sources which provide a pilot reference signal of very constant amplitude. When a signal, such as a signal transmitting telephone messages, is transmitted from city to city, substantial transmission losses in amplitude occur. To compensate for these losses, the signal must be amplified periodically to a uniform, predetermined level. In order to reach the same amplitude level each time, a pilot reference signal must be available to compare with the received signal.

The pilot signal may be obtained from a standard available A.-C. signal; this, however, may be itself subject to amplitude variations, and hence the resulting pilot signal will reflect these variations—thereby, at least to some extent, defeating the purpose of the reference. In an effort to overcome this difficulty, it has become standard procedure to monitor the reference signal continuously for amplitude. The monitored amplitude is then compared with a standard D.-C. reference signal, and any any variations from the norm are detected. A difference signal, representing these variations, is fed as a D.-C. control signal to an A.-C. amplifier to control the gain of the amplifier. Thus, a feed-back loop is used to compensate, through an amplifier, for the changes in source signal amplitude.

The present invention provides a much simpler way of achieving the same result as the complex prior-art apparatus described above. The circuit of this invention uses a transistor and a pair of diodes (one of which is a breakdown, or "Zener" diode), together with a filter. Where the input signal is not a current signal, a simple amplifier is used to convert the input signal to a sinusoidal current waveform. The output signal from the device is a single-frequency signal having a very constant voltage amplitude, and suitable for use as a pilot reference source requiring a uniform signal amplitude.

Where no A.-C. source signal is available, a portion of the constant voltage amplitude output signal from the device of the invention may be coupled back into the input to obtain oscillation within the device itself. The remainder of the signal still appears at the output to provide the constant amplitude reference output signal. The coupling means may be a resistor (where the frequency of oscillation is determined by the filter in the output) or it may be an additional filter, such as an L.-C. circuit tuned to provide oscillation at a single frequency. Preferably, however, this coupling means is piezoelectric filter, e.g., a quartz crystal. Where a piezoelectric crystal is employed, an extremely stable oscillation frequency is obtained. This frequency stability results from the amplitude stability of the signal, which is coupled back to the input through the crystal. Since the frequency of oscillation is appreciably dependent upon the voltage amplitude of the input signal crystal, the uniformity of voltage results in a concomitant uniformity of frequency.

The features and advantages of the invention will be more clearly understood from the following more detailed description of the invention, making reference to the drawings, in which.

Figure 1:
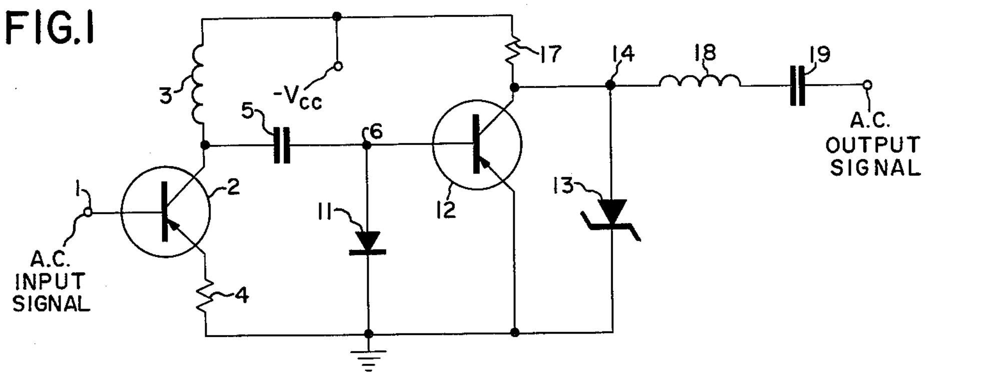
FIG. 1 is a schematic circuit diagram of a constant amplitude signal source of one embodiment of this invention, including an amplifier for conversion of the sinusoidal input signal to a sinusoidal current waveform.

Referring to FIG. 1, an A.-C. input source signal, having a varying amplitude, is fed into input 1. In the embodiment illustrated, this input signal is coupled to an amplifier section including amplifier transistor 2, inductor 3, and resistor 4. The amplifier section converts a sinusoidal signal of varying amplitude into a sinusoidal current signal whose amplitude varies in proportion to that of the input signal. Where the input signal itself is a sinusoidal current waveform, this amplifier section may be omitted. Inductor 3 of the amplifier section choke-couples the bias voltage supply $-V_{cc}$ with the collector of amplifier transistor 2. Resistor 4 provides a high impedance coupling between the emitter of amplifier transistor 2 and ground. This resistor is typically about 500 ohms.

Figure 2:
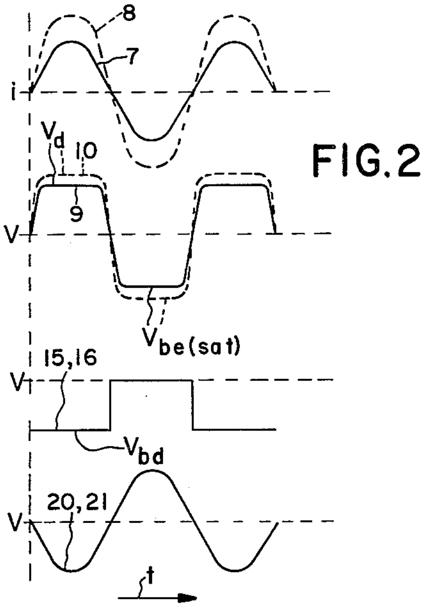
FIG. 2 is a series of graphs of current or voltage versus time, illustrating the operation of the apparatus of this invention.

Referring now to the circuit of FIG. 1 and the graph of FIG. 2, the A.-C. current signal at point 6 in FIG. 1 appears as curve 7 in FIG. 2. Curve 8 (shown as a broken line) is the same signal at point 6 when the amplitude of the input signal has been increased substantially, e.g., two-fold. Curves 7 and 8 are superimposed for purposes of illustration.

Curves 9 and 10 are the voltage waveforms corresponding to current waveforms 7 and 8, respectively. They are considerably closer together than the current amplitudes because of the operation of the invention. In the embodiment of FIG. 1, a clamping means, shown as diode 11, is used to clamp the voltage at a maximum value, $V_d$, during the positive half-cycle of voltage shown on curves 9 and 10. This clamping means is certainly preferable to limit the voltage excursion, but it is not essential. Alternatively, the base of transistor 12 can be returned to a point of constant potential, e.g., ground, on the half-cycle where the transistor 12 is saturated, by other means of coupling—for example, resistive coupling. It is essential only that such a return path be provided. Where a diode is used, the diode will conduct as the voltage rises steeply in the positive direction in phase with the current rise. The voltage at point 6 is thus limited by the maximum forward voltage across the diode, $V_d$, shown on curves 9 and 10. Note that the maximum voltage of both curves 9 and 10 is close in value. This similarity results from the relative consistency of the diode clamping voltage in spite of changes in the applied current.

The signal is now passed to the base of switching transistor 12. The emitter-base junction of switching transistor 12 is connected in parallel with diode 11. Unlike terminals are connected. Where transistor 12 is a PNP transistor, as illustrated, the N-type base of the transistor is connected to the anode of diode 11, and the P-type emitter is connected to the cathode of diode 11. Should the switching transistor 12 be an NPN transistor, the polarity of diode 11 would be reversed. Of course, the biasing would also then be reversed, as is well known in the art.

During the negative half-cycle of current shown in curves 9 and 10, the emitter-base junction of switching transistor 12 is forward biased because the transistor is in its saturation condition. The voltage, $V_{be(sat)}$, across the emitter-base junction, shown on curves 9 and 10, is determined by the forward resistance of the emitter-base junction when the transistor is in saturation. This voltage is relatively constant for different base voltages. Therefore curves 9 and 10 are relatively close together during this half-cycle as they were for the previous half-cycle. Appreciable voltage regulation has already taken place.

This degree of regulation is insufficient, however, to meet the standards set for a good pilot voltage reference source. Therefore, the output of switching transistor 12 is placed across a breakdown diode 13. The voltage across this breakdown diode 13, appearing at point 14 on FIG. 1, is shown by two coinciding curves 15 and 16 in FIG. 2. Breakdown diode 13 is biased in the negative direction by a supply voltage $-V_{cc}$ through resistor 17. The breakdown diode 13 is connected in the same polarity, with respect to the collector and emitter of switching transistor 12, as diode 11 was connected with respect to its base and emitter. When transistor 12 is a PNP transistor, as illustrated, the anode of breakdown diode 13 is connected to the collector; when the transistor 12 is an NPN transistor, the anode is connected to the emitter. Again, of course, the proper bias reversal would be made in the latter case.

When the input voltage to the base of switching transistor 12 is positive (the positive half-cycle of curves 9 and 10), the voltage at point 14, shown in curves 15 and 16, is negative (a 180° phase reversal). Breakdown diode 13 is therefore reverse biased into its avalanche region, and the breakdown voltage across it, $V_{bd}$ (shown on curves 15 and 16), is very constant. During this time, switching transistor 12 is operating in its cutoff region because of the positive input voltage. The voltage at point 14 is thus determined entirely by the constant breakdown voltage of diode 13, $V_{bd}$.

As soon as the input voltage to the base of switching transistor 12 crosses into the negative half-cycle (see curves 9 and 10), the emitter-base junction of the transistor becomes forward biased, and the transistor goes into its saturation condition. In saturation, the voltage between the collector and emitter is essentially zero. This voltage appears at point 14. Curves 15 and 16, showing the voltage at point 14, reflect this zero voltage during the negative half-cycle of curves 9 and 10. Consequently, the output of voltage waveform at point 14 from switching transistor 12 is a square wave, alternating between the breakdown voltage $V_{bd}$ of diode 13 and zero.

The square wave voltage at point 14 is then passed through a filter which, in the embodiment shown, comprises inductor 18 and capacitor 19. Of course, more complex filters may be used, if desired. The output signal voltage from the filter is shown in FIG. 2 as curves 20 and 21. The filter converts the square wave of voltage shown in curves 15 and 16 to the sinusoidal voltage waveform of curves 20 and 21.

The square wave appearing at point 14 and shown in curves 15 and 16 can have only two amplitudes—one is zero or some other reference which never changes, and the other is governed by the breakdown voltage of a breakdown diode. Such diodes are known to have an extremely constant value of breakdown voltage.

The frequency of the square wave of curves 15 and 16 is entirely determined by the frequency of the input signal. The output, however, will be 180° out of phase with the input. If constant phase is important, a conventional phase inverter may be used at the input. The sine wave output from the filter is in phase with the square wave input. The amplitude of the sine wave voltage output of the apparatus of the invention is entirely governed by the amplitude of the square wave at point 14, and therefore the output voltage amplitude is uniform irrespective of input signal amplitude changes, as illustrated by comparing input curves 7 and 8 of substantially different amplitudes with output curves 20 and 21 of the same amplitude.

The signal source of this invention entirely eliminates the previous requirement of a feed-back loop through an amplifier whose amplification varies in proportion to a D.-C. reference signal. In this invention, the variable amplitude input signal may be fed directly into the apparatus to obtain a constant amplitude output signal.

Figure 3:
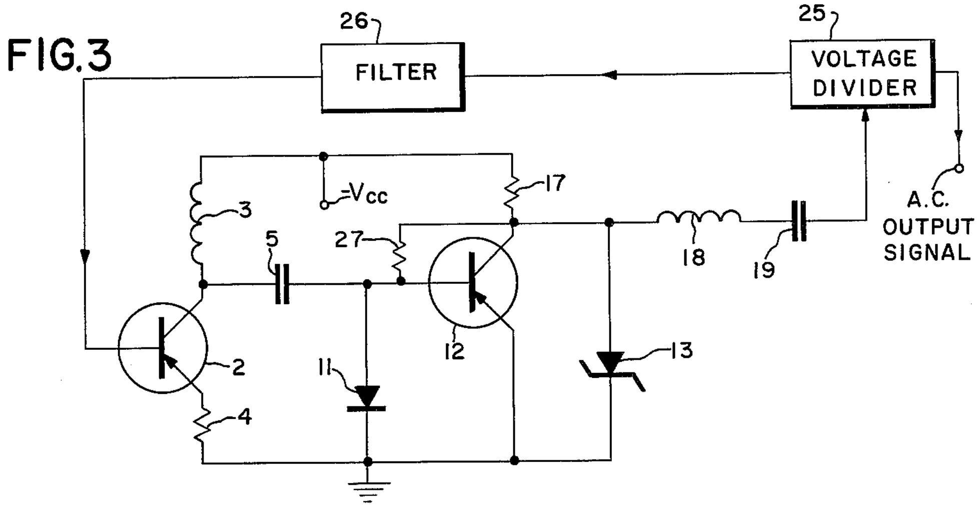
FIG. 3 is a block diagram of a constant amplitude signal source of this invention which provides its own oscillation.

Another embodiment of the invention is shown in FIG. 3. In certain applications of the invention, no A.-C. input source signal is available as a pilot. The apparatus of this embodiment of the invention generates its own input signal. The output signal is passed through a conventional voltage divider 25. A portion of the signal is coupled back into the input, as, for example, through filter 26. Appropriate biasing of the base of transistor 2 is provided in conventional manner by connection of this base to a point on a voltage divider between $-V_{cc}$ and ground.

Prior to oscillation, the output signal will be d.c. because no a.c. input signal is provided for initial oscillation. Therefore oscillation must be artifically induced in any one of several well known ways. In the embodiment shown in FIG. 3, a resistor 27, coupling the base and collector of switching transistor 12, is employed for this purpose. Resistor 27 initially biases transistor 12 into the linear region by applying the d.c. signal from the supply voltage to its base. Thus, while the breakdown diode has not avalanched, noise-induced oscillation will still build up until the switching transistor 12 goes into its cutoff state so that the breakdown diode 13 may avalanche. Normal oscillation then begins, and switching transistor 12 changes repeatedly from cutoff to saturation and back. Oscillation will continue until the d.c. power supply is removed.

During oscillation the input signal to the apparatus of FIG. 3 operates in exactly the same way as did an a.c. input signal to the apparatus of FIG. 1. The only difference between the two is that the input signal is supplied from the output instead of by use of a separate a.c. signal source.

The portion of the output signal coupled to the input is obtained by putting the signal emerging from the filter (comprising inductor 18 and capacitor 19) through a voltage divider 25. One output of the divider provides the output signal for the reference source, and the other is coupled back into the input.

The coupling means from voltage divider 25 to the input 1 may be a simple resistor, or it may be a filter as shown in FIG. 3. Where a resistor is used, the oscillation frequency is determined in the output filter, comprising inductor 18 and capacitor 19. Where the frequency of oscillation is to be determined in a coupling filter, that filter may be another L.-C. circuit, (generally of narrower bandwidth than the filter in the output) or any other conventional type of filter. A mechanical filter or a piezoelectric crystal are good examples. Piezoelectric crystals are preferable because their frequency of oscillation is very stable when the input signal supplied them has a stable amplitude. Since the input signal to filter 26 is the output signal from the device of the invention (having an extremely stable amplitude), not only the amplitude of the output signal, but also the frequency of oscillation, is very stable.

As will be apparent to one skilled in the art, many modifications and improvements may be made in the embodiments of the invention shown and described without departing materially from the spirit and scope of the invention. Therfeore, the only limitations to be placed on that scope are those recited in the claims which follow.

What is claimed is:

1. Apparatus for providing a sinusoidal output signal of constant amplitude regardless of amplitude variations in input signal, which comprises:

(a) input means adapted to receive sinusoidal signal of varying amplitude;

(b) a first transistor having a base, an emitter, and a collector;

(c) means biasing said first transistor for conduction in the linear region thereof and including a power supply, and coupling means including a conductor and resistor coupling said power supply between the collector and emitter of said first transistor;

(d) a second transistor having a base of one conductivity type and an emitter and collector of the opposite conductivity type;

(e) means coupling the base of said second transistor with the collector of said first transistor;

(f) a diode coupled in parallel with the base and emitter of said second transistor for clamping the maximum voltage therebetween at a predetermined value during one-half cycle of impressed voltage;

(g) a breakdown diode coupled in parallel with the emitter and collector of said second transistor with a polarity to conduct in a reverse direction for large voltages at the collector of said second transistor;

(h) a resistance coupling said power supply between the collector and emitter of said second transistor and across said breakdown diode, said supply voltage being connected with a polarity to reverse bias said said second transistor collector junction and to reverse bias said breakdown diode in reverse conduction;

(i) output terminals; and (j) a filter coupling the collector of said second transistor to said output terminals for producing thereat a sinusoidal voltage waveform of constant amplitude.

2. Apparatus as set forth in claim 1, further defined by means coupling said output terminals to said input means for feedback of a portion of the output voltage to establish self-excited oscillations in the absence of input signals.

3. Apparatus for providing a sinusoidal output signal of constant amplitude, which comprises:

(a) input means adapted to receive a sinusoidal input signal of varying amplitude;

(b) a first transistor having a base, an emitter, and a collector;

(c) means coupling the base of said first transistor to said input means;

(d) a source of supply voltage connected to bias said first transistor in the linear region;

(e) coupling means including an inductor and a resistor coupling said supply voltage between the collector and emitter of said first transistor;

(f) a second transistor having a base of one conductivity type and an emitter and collector of the opposite conductivity type;

(g) means capacitatively coupling the collector of said first transistor with the base and a second transistor;

(h) a diode coupled in parallel with the base and emitter of said second transistor of a polarity to conduct in a forward direction at a predetermined maximum collector voltage of the first transistor;

(i) a breakdown diode coupled in parallel with the emitter and collector of said second transistor with a polarity to conduct in a reverse direction for large voltages at the collector of said second transistor;

(j) a resistance coupling said source of supply voltage between the collector and emitter of said second transistor and across said breakdown diode, said supply voltage being of the polarity to reverse bias said second transistor collector junction, and to reverse bias said breakdown diode into reverse conduction;

(k) output means;

(l) a filter coupling the collector of said second transistor in series with said otuput means; and (m) a piezoelectric crystal coupling a portion of the signal at said output means in series with said input means so as to obtain oscillation, whereby the amplitude of the voltage waveform of the remaining signal at said output means is constant, and whereby the frequency of oscillation is stabilized by the constant amplitude of the portion of the output signal coupled through said crystal.

References Cited by the Examiner

UNITED STATES PATENTS

| | | | |
|---|---|---|---|
| 2,821,629 | 1/1958 | Finkel et al. | 328—22 |
| 2,954,527 | 9/1960 | Bradmiller | 331—109 X |
| 2,963,656 | 12/1960 | Parris | 330—24 X |
| 2,992,399 | 7/1961 | Van Tassel et al. | 331—109 |
| 3,026,487 | 3/1962 | Walsh et al. | 331—109 X |
| 3,051,905 | 8/1962 | Morris | 328—31 X |
| 3,115,582 | 12/1963 | Yoshii et al. | 307—88.5 |

FOREIGN PATENTS

| | | |
|---|---|---|
| 645,015 | 7/1962 | Canada. |
| 817,317 | 7/1959 | Great Britain. |

OTHER REFERENCES

Margopoulos et al.: IBM Technical Disclosure Bulletin, “Combined Reference-Voltage Switch,” vol. 2, No. 4, December 1959, page 77.

“Linear Circuits Regulate Solid-State Inverter,” Wileman, Electronics, April 15, 1960, pages 61–63.

ROY LAKE, *Primary Examiner.*

JOHN KOMINSKI, *Examiner.*